United States Patent
Schirle

[11] Patent Number: 6,055,120
[45] Date of Patent: Apr. 25, 2000

[54] DISK DRIVE START-UP FAILURE DETECTION UNDER DISPARATE CONDITIONS

[75] Inventor: Neal Bertram Schirle, Morgan Hill, Calif.

[73] Assignee: International Business Machines Corporation, Armonk, N.Y.

[21] Appl. No.: 08/922,956

[22] Filed: Sep. 3, 1997

[51] Int. Cl.[7] .................................................. G11B 15/46
[52] U.S. Cl. .......................................... 360/73.03; 360/71
[58] Field of Search .................................. 360/75, 77.04, 360/69, 70, 53, 73.03, 73.01; 318/634, 254, 778, 783, 788, 490, 779, 798, 461, 465, 469, 471, 472, 473

[56] References Cited

U.S. PATENT DOCUMENTS

| | | | |
|---|---|---|---|
| Re. 35,302 | 7/1996 | Hoshimi et al. | 360/77.11 |
| 5,204,593 | 4/1993 | Ueki | 360/75 X |
| 5,235,264 | 8/1993 | Kaneda et al. | 360/73.03 X |
| 5,355,121 | 10/1994 | Naito et al. | 340/584 |
| 5,379,166 | 1/1995 | Tsukada et al. | 360/73.03 X |
| 5,412,809 | 5/1995 | Tam et al. | 360/73.03 X |
| 5,764,430 | 6/1998 | Ottesen et al. | 360/69 X |

FOREIGN PATENT DOCUMENTS

| | | | |
|---|---|---|---|
| 1-267887 | 10/1989 | Japan | G11B 33/14 |
| 4-258848 | 9/1992 | Japan | G11B 19/02 |
| 6-162645 | 6/1994 | Japan | G11B 19/02 |

*Primary Examiner*—Aristotelis M. Psitos
*Assistant Examiner*—K. Wong
*Attorney, Agent, or Firm*—John H. Holcombe

[57] ABSTRACT

Disclosed are a method and apparatus for detecting disk drive start-up failure under disparate temperature conditions by employing a temperature sensor to measure the temperature of the disk drive at start-up. A controller selects, in response to the measured temperature, a start-up failure timing corresponding to that measured temperature. The controller then detects whether the disk drive reaches operational speed within the selected start-up failure timing. Preferably, the temperature sensor is digital. The temperature sensor may be mounted on the drive electronics card, or on electronics in the disk enclosure. The controller may have a stored lookup table relating various temperatures to start-up failure timings for selecting a start-up failure timing corresponding to the measured temperature. This method allows selection of a motor torque constant that does not compromise normal operating performance based on cold start conditions.

17 Claims, 3 Drawing Sheets

DISK DRIVE START-UP FAILURE DETECTION UNDER DISPARATE CONDITIONS

FIELD OF THE INVENTION

This invention relates to disk drives, and, more particularly, to detecting motor spin-up failures that occur during start-up of a disk drive under disparate temperature conditions.

BACKGROUND OF THE INVENTION

An error checking procedure for the proper operation of disk drives, primarily magnetic disk drives, is to conduct a "time out test" at the start-up of the disk drive. In a time out test, if the disk drive does not reach full operational speed within the time out or specified period, it is deemed an error. Often, an error signal is sent by the drive controller to a host system and the drive is turned off.

However, both ball bearing and oil bearing spindles have increased drag torque at low temperatures, primarily due to increased viscosity of the oil. The increased drag is most significant for oil bearing spindles, which may be used in very high speed hard disk drives, such as drives that operate at 10,000 revolutions per minute (rpm). The increased drag torque is also prevalent in ball bearing spindles used in 3.5 inch form factor hard disk drives, but is greater on smaller drives where the bearing drag is a larger percentage of the total spindle drag compared to today's 3.5 inch drives.

The specific disadvantage is that the increased drag of the spindle bearing at low temperature start conditions may be so high that the spindle does not come up to speed in the specified time. For a 10,000 rpm, 1.6 inch high, 3.5 inch form factor oil bearing spindle, the difference in power due to additional bearing drag can be 1.0 Watt between 10 degrees C. and 25 degrees C. This corresponds to a significant difference in drag torque. To design the motor with a torque constant based upon this worst case start condition may significantly compromise the motor at nominal operating conditions. The increased drag at low temperature starts would demand a lower torque constant to meet necessary voltage headroom conditions for this worst case start condition. Specifically, increased torque requires increased current which in turn causes increased voltage drop across resistive elements in the driver circuit (including the motor stator windings). The voltage increase can be calculated from Ohm's law: $V=I \times R$, where V is voltage, I is current and R is resistance. These higher voltages in the circuit take away from the voltage margin available for speed control (or voltage headroom). Since a large portion of the voltage in the circuit is due to the back EMF from the motor (which can be calculated as the motor torque constant in Nm/amp×the motor speed in radians/second), a typical design practice is to reduce the motor torque constant just enough so that at worst case drag conditions there is sufficient voltage headroom for adequate speed control.

The worst case drag condition exists at a cold temperature start. If this worst case low temperature start condition could be handled in some other way, the motor design would not have to be compromised with a reduced torque constant.

The spindle motor bearings in typical disk drive spindle motors are located very close to the motor windings. The motor windings are the most significant source of heat in a motor. Thus, as the motor starts, the bearings heat up and increase in temperature. The bearing drag torque is a function primarily of the viscosity of the bearing grease base oil and of the stiffness of the grease, both of which reduce with increased temperature. So the bearing drag torque reduces with time shortly after the motor starts spinning due to the heating of the bearings. By allowing more time to spin up to speed before closed loop motor control takes over (which necessitates voltage headroom) the bearing drag can be reduced which in turn will allow more voltage headroom.

SUMMARY OF THE INVENTION

An object of the present invention is to provide start-up failure detection for disk drives without compromising the motor design with a reduced torque constant due to the higher torque cold start condition.

Another object of the present invention is to provide start-up failure detection without compromising the normal room temperature start or warm temperature start condition disk drive bring-up time for the cold start condition.

Disclosed are a method and apparatus for detecting disk drive start-up failure under disparate temperature conditions by employing a temperature sensor to detect the temperature of the disk drive at start-up. A controller selects, in response to the detected temperature, a start-up failure timing corresponding to that detected temperature. The controller then detects whether the disk drive reaches operational speed within the selected start-up failure timing. Preferably, the temperature sensor is digital. The temperature sensor may be mounted on the drive electronics card within the disk enclosure.

As an additional feature, the controller may have a stored lookup table relating various temperatures to start-up failure timings for selecting a start-up failure timing corresponding to the detected temperature.

Other objects, features, and advantages of the present invention will be apparent from the accompanying drawings and from the detailed description below.

BRIEF DESCRIPTION OF THE DRAWINGS

The present invention is illustrated by way of example and not limitation in the figures by the accompanying drawings in which like references indicate similar elements and in which.

DETAILED DESCRIPTION OF THE INVENTION

Figure 1:
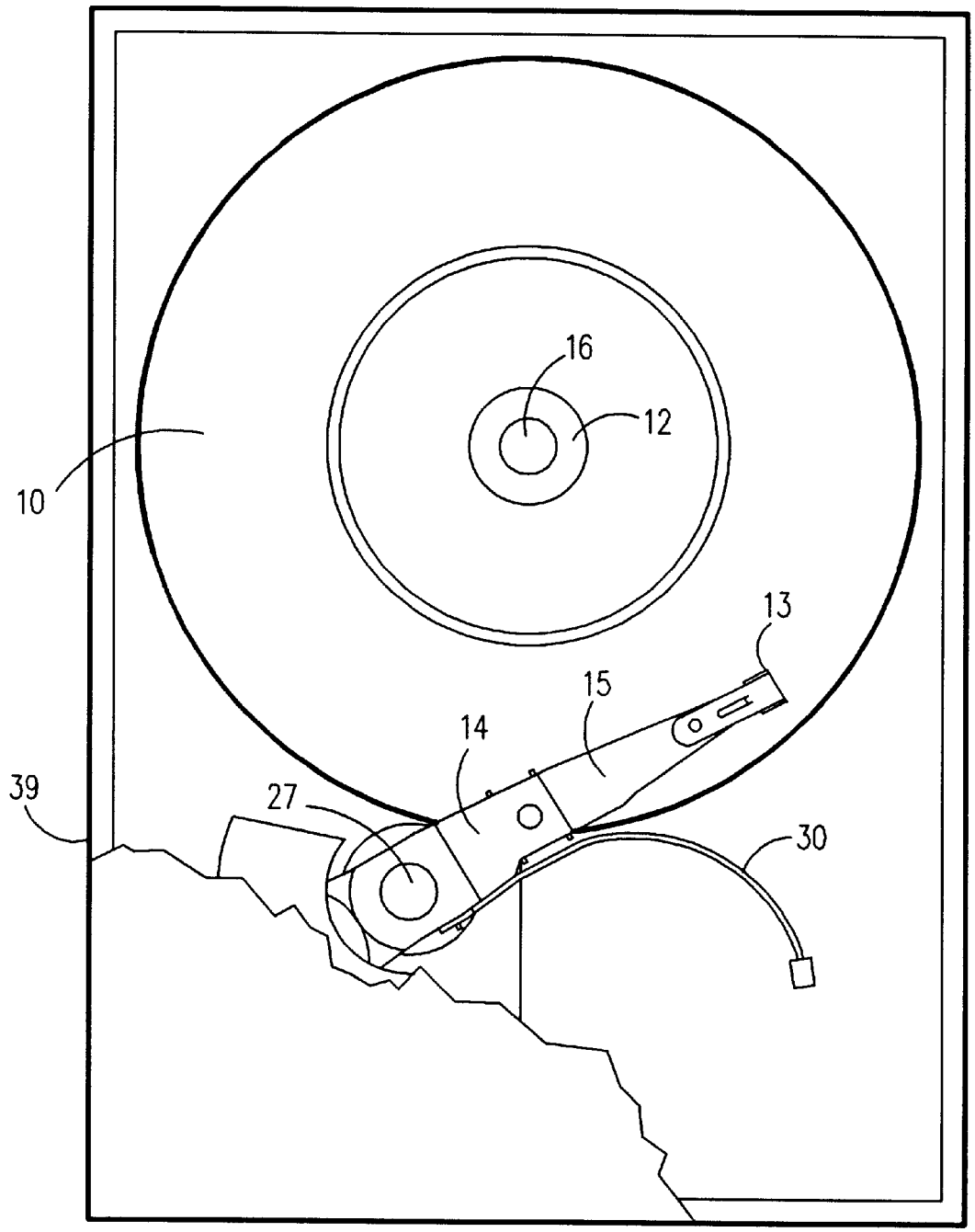
FIG. 1 is a partially cut away top view of a magnetic data recording disk drive which incorporates the present invention.
Figure 2:
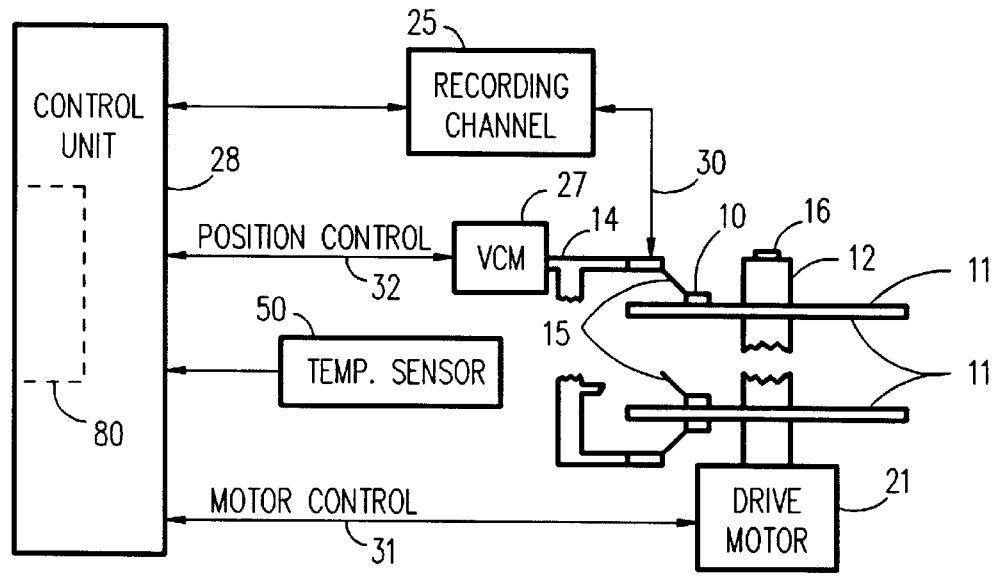
FIG. 2 is a schematic and block diagram illustration of the magnetic disk file of FIG. 1, incorporating the present invention.

One embodiment of a magnetic disk drive incorporating the present invention is shown in FIGS. 1 and 2.

A magnetic recording disk 10, having "top" and "bottom" surfaces 11, is supported on a spindle 12, rotatably mounted on a spindle support shaft 16. The spindle may be supported for rotation by either ball bearings or by oil bearings. The oil in the ball bearings or the oil of the oil bearings provide a drag which increases as the viscosity of the oil increases. The spindle is rotated by a spindle motor 21. The motor 21 is typically a DC brushless motor. As described above, the greatest torque demand on motor 21 is at start-up. The viscosity of the oil is greatest at lower temperatures, causing an increased drag torque on the spindle motor for low temperature starts.

The magnetic recording on each disk surface is in the form of an annular pattern of concentric data tracks (not shown). A head carrier 13 is positioned on the top surface of disk 10. Carrier 13 is an air-bearing slider having an air-bearing surface facing toward the disk. The head carrier 13 supports a read/write transducer on its trailing end for reading and writing data to the magnetic media on the disk surface. The transducer may be an inductive read/write head or a dual element head having an inductive write element and a magnetoresistive read element. Carrier 13 is attached to an actuator arm 14 by a suspension 15. The suspension 15 provides a slight spring force that biases the carrier 13 toward the disk surface. A second carrier, also supporting a read/write transducer, is positioned on the bottom surface of disk 10 and is attached to an actuator arm by means of a suspension.

Actuator arms 14 are attached to a rotary actuator 27. The actuator is typically a rotary voice coil motor (VCM) that comprises a coil movable within a fixed magnetic field, the direction and velocity of the coil movements being controlled by motor current signals supplied by a microcontroller. As the disk 10 rotates, the rotary actuator 27 moves the carriers 13 in a generally arcuate path radially in and out over their respective disk surfaces so that the read/write transducers may access different portions of the disk surfaces where data is desired to be read or recorded. Both the actuator 27 and spindle support shaft 16 are mounted to a baseplate 39.

In this type of disk drive, the rotation of the disk 10 generates an air bearing between the carrier 13 and its associated disk surface. During operation of the disk drive, the air bearing thus counterbalances the slight spring force of the suspension 15 and supports the carrier 13 off and slightly away from the disk surface 11 by a small, substantially constant spacing. The present invention is also applicable to other types of disk drives, however, such as contact or near-contact recording disk drives, where the head carrier is urged into contact with the disk during read and write operations, and to optical disk drives.

The various components of the disk drive are controlled in operation by control signals generated by the microcontroller 28. Typically, the microcontroller comprises logic control circuits, memory storage, and a microprocessor, for example. The microcontroller generates control signals for various drive operations, such as spindle motor control signals on line 31, including "start-up", and track following and seek control signals on line 32 for actuator 27.

Data from the surface of disk 10 is read by the read/write head on slider 13 and sent on cable 30 to read/write channel circuitry 25. Write signals are sent on cable 30 from the read/write channel circuitry 25 to the head for writing on the disk. Similarly, the read/write head reads head position servo information recorded on the disk, typically at equally angularly spaced servo sectors embedded between data sectors. The servo information is also sent over cable 30 to servo circuitry for demodulation and conversion to track position signals. Typically, the track position signals are employed by servo control circuitry to control the actuator 27 to pivot the arms 14 radially inward and outward to move and position the carriers 13 to the desired track and to maintain track following of the desired track on the corresponding surface 11 of disk 10.

Figure 3A:
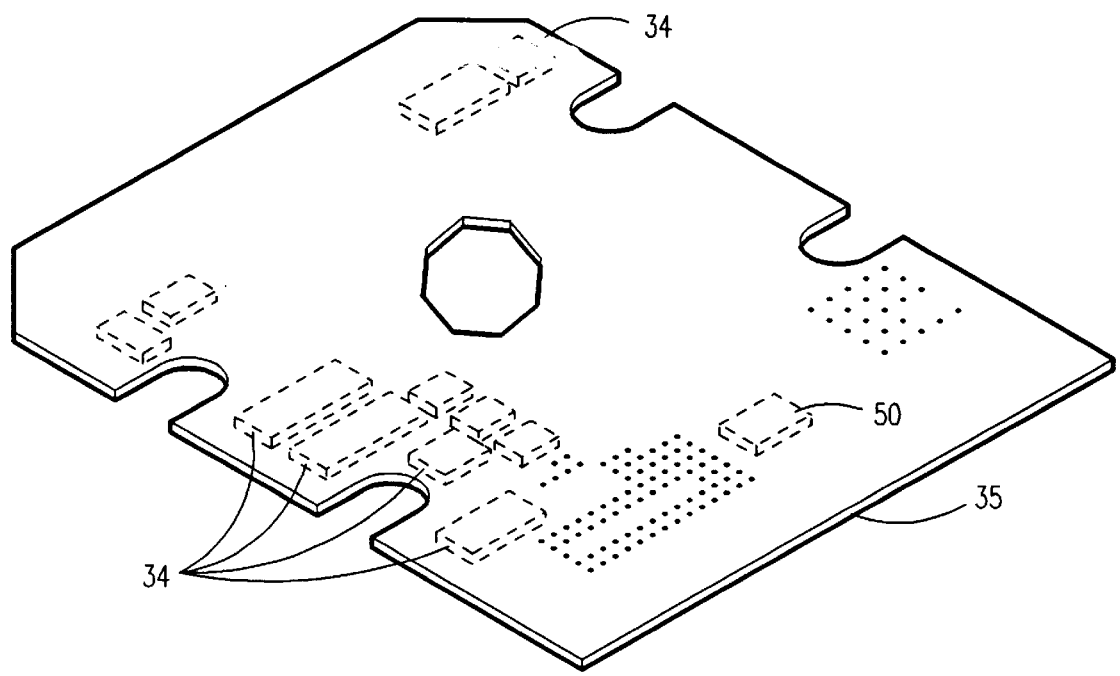
FIG. 3 is a perspective view exploded representation of a printed circuit board and a baseplate or base casting for the disk drive of FIG. 1 which incorporates the present invention.
Figure 3B:
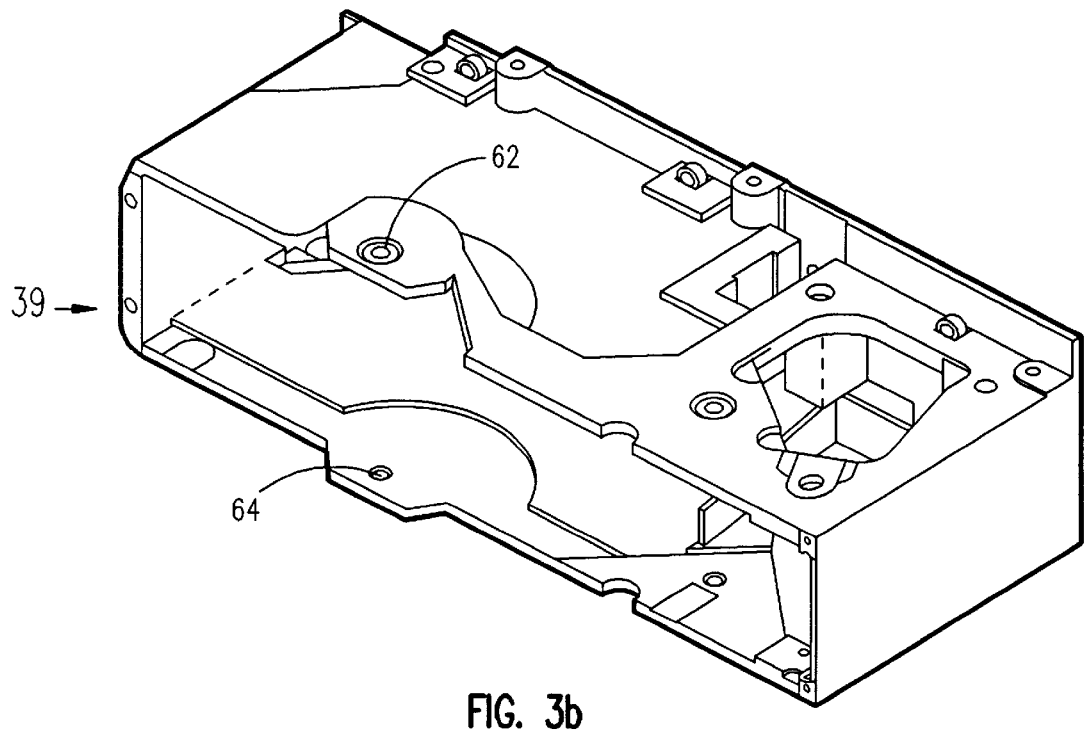

Usually, the circuitry described above is located on an electronics card 35, such as that illustrated in FIG. 3. The "electronics card", also called "printed circuit board" is defined as any suitable support for electronic components and interconnecting leads. Examples of circuit components 34, are shown by the dotted lines, and may be located on the top or bottom of electronics card 35.

The electronics card 35 is mounted on a baseplate 39, which may comprise a clamshell or a separate baseplate and cover plate. The spindle support shaft 16 is mounted in holes 62 and 64.

As a fail-safe error checking capability, many disk drives utilize the previously described time-out test to detect any failure of the motor 21 to bring the spindle 12 up to operational speed within a reasonable or specified time. A disadvantage is that the increased drag of the spindle bearing at low temperature start conditions may be so high that the spindle 12 may not come lo up to speed in the specified time, even though the motor 21 is operating at full torque. This is most significant for oil bearing spindles, but is also a disadvantage in ball bearing spindles for smaller drives, where the bearing drag is a large percentage of the total spindle drag.

As discussed above, a motor designed to meet this worst case start condition may compromise performance of the motor in order to meet the voltage headroom requirements.

Also, a time-out test designed to meet this worst case start condition may compromise the normal room temperature start or warm temperature start condition bring-up time.

The advantage provided by the present invention is to allow an increased time to reach spindle speed only for low temperature cold start conditions, which is often the worst case scenario.

Figure 4:
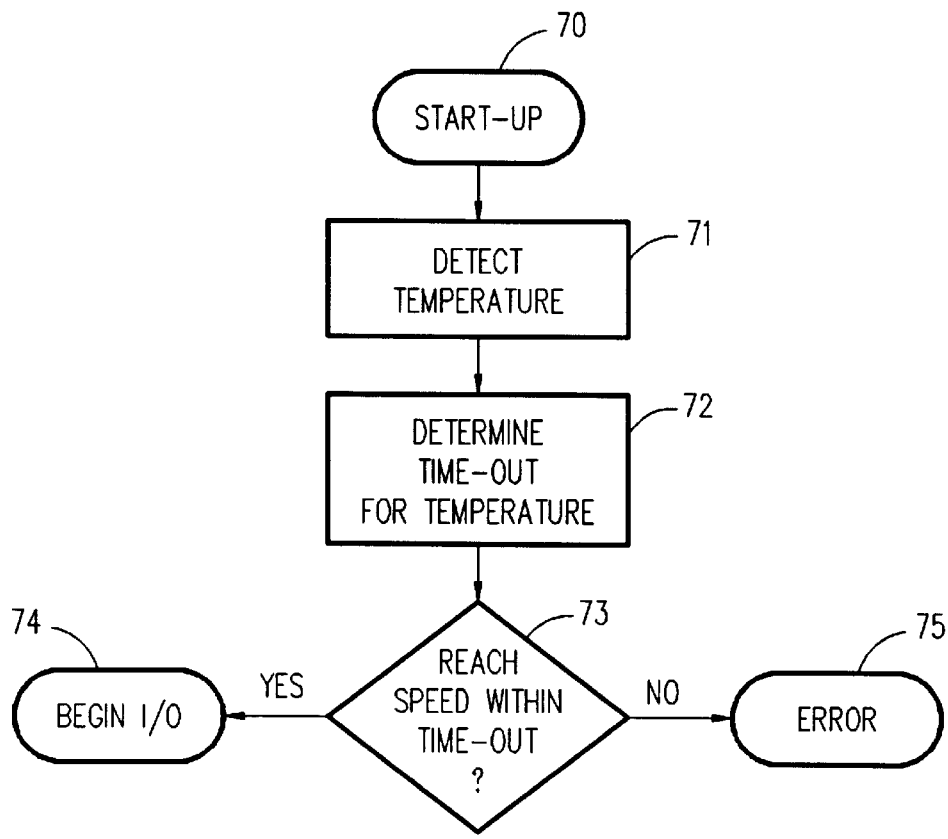
FIG. 4 is a flow chart depicting the method of the present invention.

Referring to FIGS. 2 and 4, a temperature sensor 50 is provided within the enclosure for the disk drive to measure the ambient temperature and provide the sensed temperature to controller 28. The start-up step 70, may be initiated by a start-up command to controller 28. The temperature sensor 50 detects the ambient temperature of the disk drive in step 71. As illustrated in FIG. 3, the sensor 50 may be located on the electronics card 35. An example of a sensor 50 is "LM75 Thermal Watchdog Module", which is commercially available from National Semiconductor. The module may provide a 9 bit number proportional to temperature and have a temperature range of −50 degrees C. to 125 degrees C.

The detected temperature may be used by controller 28, as shown in step 72, for determining whether a low temperature condition exists. If so, an extended time-out period is selected. If not, a normal time-out period is selected. In one embodiment of the present invention, controller 28 employs a lookup table 80 which correlates the measured temperature to the appropriate time-out period, or failure timing. For one embodiment, the lookup table 80 is stored in memory or in a ROM in controller 28. The failure timing is the time in which the spindle should reach normal operating speed. The amount of increased failure timing would be dependent on the spindle and drive design: its power outputs, thermal capacitance and thermal conductivities.

There may be a significant difference in drag torque for only a small change in temperature. For example, the difference in power required at start-up can be one Watt between 10 degrees C. and 25 degrees C. Thus, preferably, lookup table 80 comprises a plurality of start-up temperature ranges and associated failure timings.

In step 73, the speed sensor is checked by controller 28 at the end of the time-out period to determine whether the spindle is at the normal operating speed. The speed sensor may be a voltage sensor which detects the voltage across the motor 21 to indicate that the normal operational speed has been reached. Alternatively, the servo data recorded on a surface 11 of disks 10 may be monitored to detect that the desired nominal speed has been reached. If "Yes", controller 28 in step 74 begins normal input/output operation of the disk drive, writing and/or reading data from the disk drive. If "No", an error is indicated in step 75. The error indication may be provided in the form of an error signal provided by disk drive controller 28 to the host computer system connected to the controller. Additionally, the controller 28 shuts down drive motor 21.

The temperature of the bearings increases very fast at spindle start since the bearings are in close proximity to the motor. In most disk drive designs, the ball bearings straddle the motor. The motor 21 heats the spindle support shaft 16 and the spindle 12, and the air next to the bearings, which, in turn, heat the bearings. The friction from the bearings is almost negligible compared to the heat produced by the motor during start and at run. Measurements of the temperature transients at start show that the motor reaches near steady state temperatures in less than 60 seconds.

For most oil bearing designs, the bottom bearing is typically close to the motor 21 attachment to the spindle support shaft 16. Thus, the bottom bearing would heat faster than the top bearing. However, both bearings tend to increase in temperature quickly at start.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for detecting disk drive start-up failure under disparate temperature conditions, comprising the steps of:
   measuring the temperature of said disk drive at start-up;
   determining the start-up failure timing that correlates to said measured temperature; and
   detecting whether said disk drive reaches operational speed within said determined start-up failure timing.

2. The method of claim 1, wherein said operational speed detecting step additionally comprises the step of signaling start-up failure upon said disk drive not reaching operational rotation speed within said determined start-up failure timing.

3. The method of claim 1, wherein said temperature measuring step additionally comprises providing a digital output signal representative of the temperature of said disk drive.

4. The method of claim 3, wherein said determining step comprises the step of looking up said detected temperature in a table to select the start-up failure timing corresponding to said detected temperature.

5. The method of claim 4, wherein said operational speed detecting step additionally comprises the step of signaling start-up failure upon said disk drive not reaching operational rotation speed within said determined start-up failure timing.

6. The method of claim 1, wherein said method is initiated by a signal to said disk drive to accelerate to an operational rotation speed, and said signal initiates said temperature measuring step and said operational speed detecting step.

7. A start-up failure detection system for a magnetic disk drive under disparate temperature conditions comprising:
   a temperature sensor for detecting the temperature of said disk drive; and
   a controller responsive to start-up of said magnetic disk drive for selecting, in response to said detected temperature, a start-up failure timing corresponding to said detected temperature, and for detecting whether said disk drive reaches operational speed within said selected start-up failure timing.

8. The start-up failure detection system of claim 7, additionally comprising a sensor for detecting that said disk drive has reached operational rotation speed, and said controller responds to said sensor for signaling start-up failure upon said sensor not signaling that said disk drive has reached operational rotation speed within said selected start-up failure timing.

9. The start-up failure detection system of claim 8, wherein said temperature sensor comprises a digital temperature sensor providing a digital output signal representative of the temperature of said disk drive.

10. The start-up failure detection system of claim 9, wherein said temperature sensor is located on an electronics card of said disk drive.

11. The start-up failure detection system of claim 9, wherein said controller additionally comprises a stored lookup table correlating various temperatures to start-up failure timings for selecting a start-up failure timing corresponding to said detected temperature digital output signal.

12. A magnetic disk drive, comprising:
   an enclosure;
   at least one magnetic disk mounted for rotation about a central axis;
   a motor for rotating said at least one magnetic disk about said central axis;
   an actuator having at least one transducer for moving said at least one transducer into read and\or write relationship with said at least one disk;
   a temperature sensor mounted within said enclosure for detecting the temperature of said disk drive; and
   a controller generating control signals for operating said motor, including start-up of said motor to bring said motor to operational speed, and said controller is responsive to initiation of said start-up of said motor for selecting, in response to said detected temperature, a start-up failure timing corresponding to said detected temperature, and for detecting whether said disk drive reaches operational speed within said selected start-up failure timing.

13. The magnetic disk drive of claim 12, additionally comprising a sensor for detecting that said disk drive has reached operational rotation speed, and said controller responds to said sensor for signaling start-up failure upon said sensor not signaling that said disk drive has reached operational rotation speed within said selected start-up failure timing.

14. The magnetic disc drive of claim 13, wherein said temperature sensor comprises a digital temperature sensor providing a digital output signal representative of the temperature of said disk drive.

15. The magnetic disk drive of claim 14, additionally comprising an electronics card within said enclosure and said temperature sensor is located on said electronics card.

16. The magnetic disk drive of claim 14, wherein said controller additionally comprises a stored lookup table relating various temperatures to start-up failure timings for selecting a start-up failure timing corresponding to said detected temperature digital output signal.

17. The magnetic disk drive of claim 14, wherein said motor comprises a DC brushless motor.

* * * * *